United States Patent [19]
Flink

[11] Patent Number: 5,966,864
[45] Date of Patent: Oct. 19, 1999

[54] CHRISTMAS TREE STAND

[76] Inventor: Michael J. Flink, 22590 SW. 172 Ct., Miami, Fla. 33170

[21] Appl. No.: 09/137,962

[22] Filed: Aug. 21, 1998

[51] Int. Cl.$^6$ ....................................................... A47G 7/02
[52] U.S. Cl. ................................................................ 47/40.5
[58] Field of Search ............................... 47/79, 40.5, 48.5

[56] References Cited

U.S. PATENT DOCUMENTS

| | | | |
|---|---|---|---|
| 5,121,897 | 6/1992 | Sofy | 47/40.5 |
| 5,157,868 | 10/1992 | Munoz | 47/40.5 |
| 5,369,910 | 12/1994 | Copenhaver | 47/40.5 |
| 5,725,193 | 3/1998 | Adams | 47/40.5 |

Primary Examiner—Thomas Price
Attorney, Agent, or Firm—Robert M. Downey, P.A.

[57] ABSTRACT

A Christmas tree stand apparatus includes a receptacle sized and configured for supporting receipt of a lower end of a tree trunk therein and a base for supporting the receptacle and Christmas tree in an upright position. Sight gauges are viewable about the entire outer periphery of the tree stand to facilitate visual indication of an amount of water within a reservoir of the receptacle. The apparatus further includes a container for holding a charge of water and a flexible hose extending from the container with a distal end that releasably connects to fill ports on the receptacle to fill water from the container into the reservoir. Connection of the hose distal end to a drain port on the base and subsequent actuation of a release valve facilitates drainage and emptying of water from the reservoir into the container. Brace members include disc-shaped feet providing enlarged surfaces which engage and hold the lower end of the tree trunk within the receptacle, without penetrating the tree trunk, upon threaded inward advancement of the brace members towards a center of the receptacle.

16 Claims, 2 Drawing Sheets

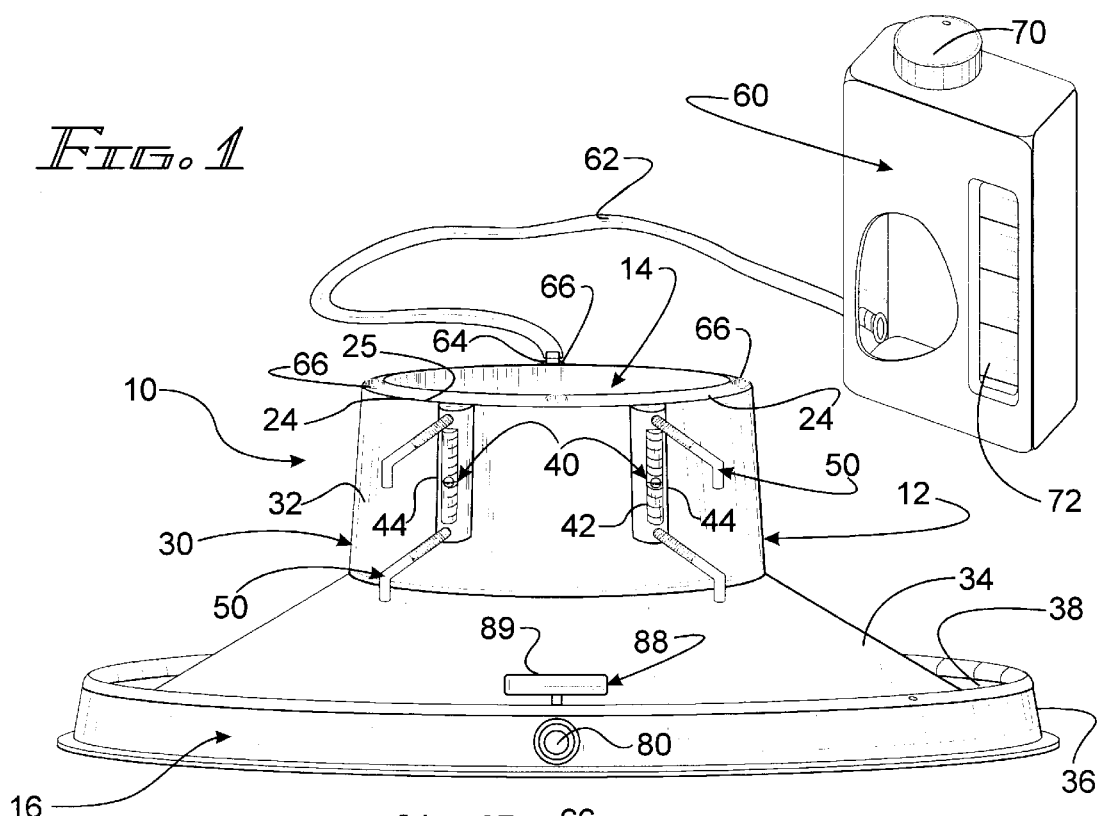
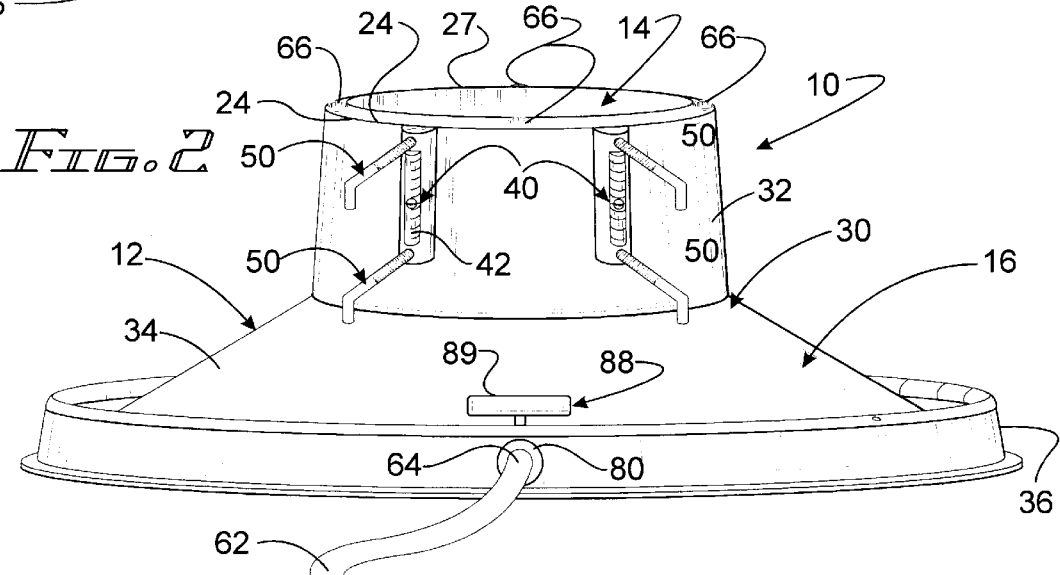
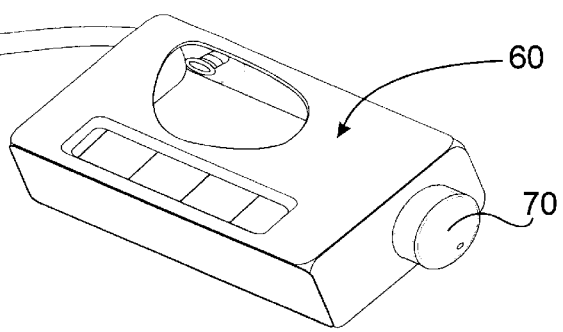

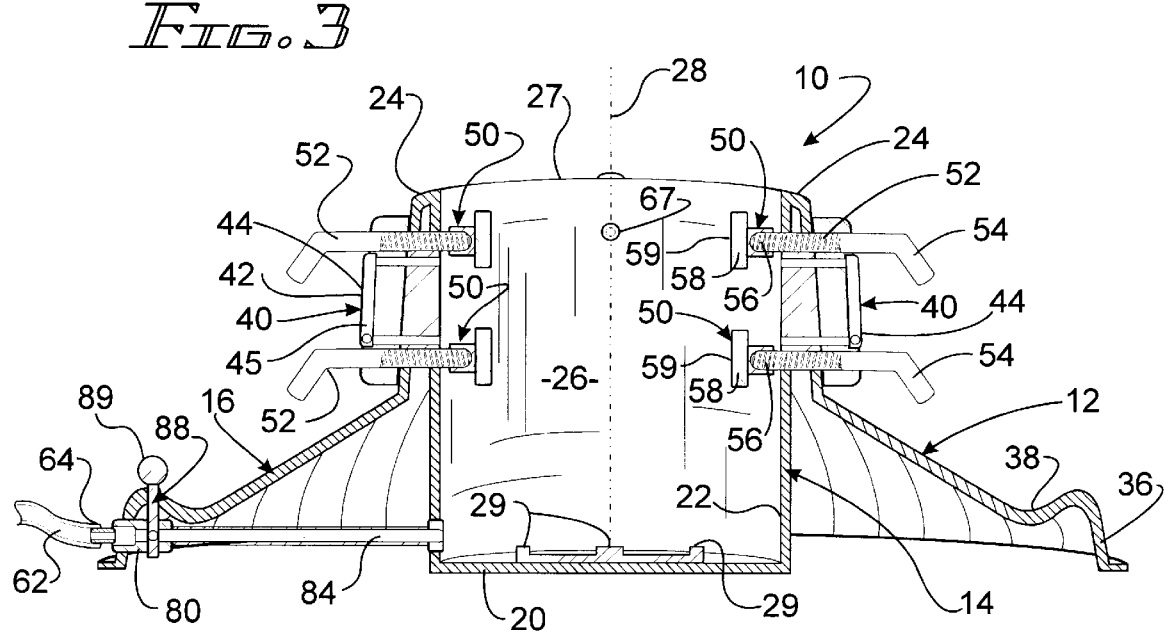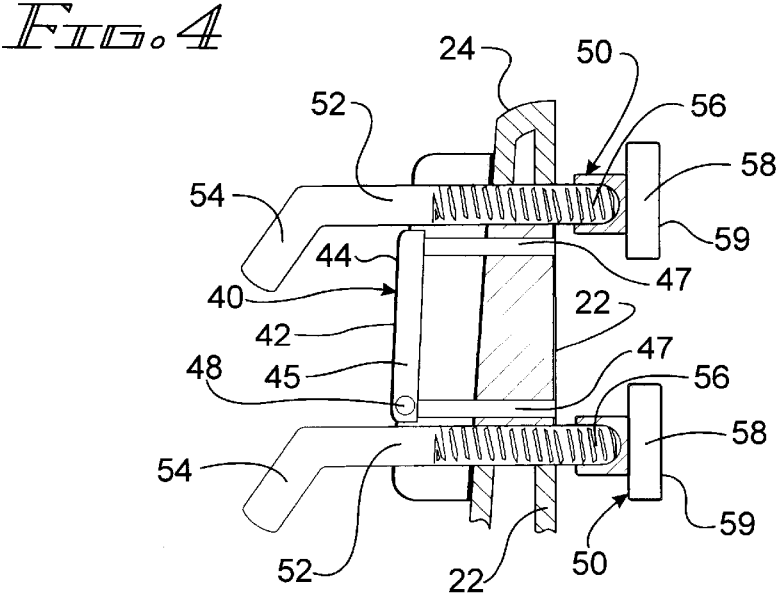

CHRISTMAS TREE STAND

BACKGROUND OF THE INVENTION

1. Field of the Invention

The invention relates generally to tree stands and, more particularly, to a Christmas tree stand having means for viewing an amount of water contained within a receptacle of the tree stand and means for transferring water between the receptacle and a container to thereby facilitate filling and draining of the receptacle while a tree remains supported upright therein.

2. Discussion of the Related Art

Tree stands of various construction are well known and are used for the purpose of holding cut trees, particularly Christmas trees, in an upright, natural posture. In general, tree stands usually include a receptacle for receiving the lower end of the tree trunk and bracing means, e.g., thumb screws, for holding the tree in the desired upright position. To maintain a healthy, live appearance, the tree must be kept hydrated. To do this, a charge of water is filled into the receptacle. As the tree soaks up water, through capillary action, the volume of water in the receptacle needs to be replaced, thereby requiring regular monitoring of the water level therein and refilling when the level becomes low.

The various tree stands known in the art fail to provide a means for visually determining the water level within the receptacle when viewing the stand from any location about its periphery. To regularly inspect the water level in existing tree stands, it is thus necessary to crawl under the tree and dip one's fingers into the receptacle, estimating the water level based on the sense of touch. When the water level becomes low, or the receptacle is empty, a replenishing charge of water needs to be filled in the receptacle. This is typically done by filling a glass or pitcher with water, again crawling under the tree, and pouring the water through the gap which remains between the top edge of the receptacle and the tree trunk. Because the space is usually tight and difficult to see, being cluttered with out-stemming branches, spills are a common occurrence. Thereafter, when it is time to take the tree down, the combined tree and stand need to be moved outdoors while maintaining the tree in the upright position so that water in the receptacle does not spill. Once outdoors, the tree is tipped and leaned over in order to drain the water from the receptacle. Most people find this procedure to be awkward and somewhat strenuous, only adding to the dreadful experience of taking down decorations at the end of the holiday season.

SUMMARY OF THE INVENTION

The present invention is directed to tree stand for supporting a tree, e.g., a Christmas tree, in an upright, natural orientation. The tree stand includes a receptacle for receiving the lower end of the tree trunk therein. The receptacle includes a bottom, a peripheral wall surrounding an interior reservoir and extending from the bottom to a top rim. The stand further includes a base for supporting the receptacle and tree in the desired, upright posture. The base includes an outer skirt having an upper annular wall portion extending downwardly from the top rim and a lower annular wall portion extending downwardly and outwardly from the upper annular wall portion to an outermost floor engaging portion. Water level sight gauges are provided on the receptacle and are visible from an exterior of the upper annular wall portion for visual indication about the entire outer periphery of the tree stand of a water level within the reservoir.

A container for holding a charge of water includes an open end with a removable cap. A flexible hose extends from the container and terminates at a distal end. The distal end of the hose is specifically sized for selective connection to fill ports on the top rim to fill water from the container into the reservoir. The distal end of the hose is further adapted for connection to a drain port on the base, wherein actuation of a release valve causes water to drain from the reservoir and into the container, thereby emptying the water contents from the receptacle.

Brace members extending through the peripheral wall include threaded bolts or screws having disc-shaped feet fitted to distal ends within the receptacle. The feet provide enlarged brace surfaces which engage and grasp the lower end of the three trunk, without penetrating through the bark of the tree, upon threaded inward advancement of the bolts and attached feet towards a center of the receptacle.

With the foregoing in mind, the present invention has the following objects and advantages over the various tree stands in the related art. In particular, it is a primary object of the present invention to provide a tree stand having means to easily view the water level in the receptacle and further including means to fill water into the receptacle without spilling water and without having to move, rotate or alter the tree.

It is a further object of the present invention to provide a tree stand having means for transferring water between a container and the receptacle of the tree stand, including a dual system for filling and draining water in the receptacle.

It is yet another object of the present invention to provide a tree stand having means to drain water from the receptacle into a container without having to move the tree stand or the tree supported therein.

It is still a further object of the present invention to provide a tree stand having one or more externally visible sight gauges to facilitate easy visual determination of an amount of water contained in the reservoir of the tree stand from any position about the periphery of the tree stand.

It is still a further object of the present invention to provide a tree stand having a container and flexible hose which releasably connects to the tree stand for filling and draining water within the receptacle thereof, and wherein the container and hose disconnect when not in use to thereby maintain the overall aesthetic appearance of the tree and stand.

It is yet a further object of the present invention to provide a tree stand having means for filling and draining water into a receptacle thereof, and wherein the tree stand avoids the use of electrical components thereby eliminating safety hazards.

It is still a further object of the present invention to provide a tree stand, as set forth above, which avoids the use of multiple mechanical parts and/or electrical components, thereby minimizing maintenance and increasing durability of the invention.

It is still a further object of the present invention to provide a tree stand having brace means for holding the base of the tree trunk within the receptacle of the tree stand, wherein the brace means includes threaded bolt members having feet on the distal ends thereof with an enlarged surface area to thereby avoid penetration of the bolts through the trunk of the tree.

These and other objects and advantages of the present invention will be more readily apparent in the following detailed description taken in conjunction with the accompanying drawings.

BRIEF DESCRIPTION OF THE DRAWINGS

For a fuller understanding of the nature of the present invention, reference should be made to the following detailed description taken in conjunction with the accompanying drawings in which:

FIG. 1 is a perspective view of the tree stand apparatus of the present invention, showing the tree stand, a water container and flexible hose connecting the container to a fill port on the tree stand;

FIG. 2 is a perspective view of the tree stand apparatus, showing the container and hose connected to a drain port on the tree stand;

FIG. 3 is a cross-sectional view of the tree stand of the present invention; and FIG. 4 is an isolated cross-sectional view of the sight gauge and brace means on the tree stand.

Like reference numerals refer to like parts throughout the several views of the drawings.

DETAILED DESCRIPTION OF THE PREFERRED EMBODIMENT

Referring to the drawings, the tree stand apparatus is shown and generally indicated as 10. The apparatus 10 includes a stand 12 which includes a receptacle 14 and a base 16. In a preferred embodiment of the invention, the stand 12, including the receptacle 14 and base 16, is manufactured as an integral unit and formed of a moldable material such as a plastic composition. It should be noted, however, that the stand of the present invention may be of other shapes and structure such as a cylindrical receptacle supported on outwardly extending leg members, wherein the leg members may be fastened to a flat planar base (e.g., a sheet of wood).

In the preferred embodiment, as seen in FIGS. 1 and 2, the receptacle is defined by a generally flat bottom 20 and a cylindrical peripheral wall structure 22 extending upwardly from the bottom to a top rim 24 having a top surface 25. The peripheral wall 22 surrounds an interior reservoir 26 sized and configured for receipt of the lower end portion of a tree trunk therein so that the cut bottom end of the tree trunk rests on the bottom 20 of the receptacle 14 with a gap remaining about the trunk between the trunk and the peripheral wall. The bottom of the receptacle may be provided with upwardly extending teeth members 29 for biting into the cut end of the tree trunk to thereby discourage movement of the tree trunk relative to the receptacle. The top rim surrounds an open top 27 of the receptacle sized and configured for passage of the lower end of the tree trunk to facilitate placement and removal of the tree trunk within the receptacle. A central longitudinal axis 28 of the receptacle extends from a center of the bottom 20 through the open top 27.

The base 16 of the tree stand 12 supports the receptacle 14, and the tree held therein, in an upright, natural posture. The base includes an outer skirt 30 having an upper annular wall portion 32 extending downwardly from the top rim and a lower annular wall portion 34 extending downwardly and outwardly from the upper annular wall portion to an outermost floor engaging annular leg 36. In a preferred embodiment, a trough or moat 38 is formed between the lower annular wall portion 34 and the annular leg to thereby capture water which may inadvertently spill from the receptacle, thereby preventing water from damaging the underlying floor surface.

Liquid level display means 40 are provided to facilitate visual indication of an amount of water filled within the reservoir 26 of the receptacle 14, when viewed from an exterior of the stand. The liquid level display means 40 includes a plurality of sight gauges 42 each being defined by a vertical cavity 45 in fluid communication with the reservoir 26 via channels 47 formed through the peripheral wall of the receptacle. A transparent window 44 on an exterior of the upper annular wall portion of the base covers the sight gauge cavity on an exterior of the upper annular wall portion of the base. A ball-shaped float 48 may be captured within each of the sight gauge cavities to further facilitate visual identification of the water level when viewed from an exterior through the transparent windows. As seen in FIGS. 1 and 2, a plurality of sight gauges 42 are provided at spaced intervals about the outer periphery of the stand so that the water level can be determined when viewing the stand from virtually any location about the outer periphery thereof.

Brace means 50 are provided for holding the lower end of the tree trunk within the receptacle. In a preferred embodiment, the brace means includes a plurality of threaded bolt members 52 extending through the peripheral wall and each including a proximal end 54 on an exterior of the stand to facilitate threaded manipulation of the bolts through the peripheral wall. Each of the bolt members 52 further include a distal end 56 normally positioned within the interior reservoir of the receptacle and directed towards the central vertical axis. The distal ends are each fitted with disc-shaped feet 58 having an enlarged engagement surface 59 for press fit engagement against the outer bark surface of the tree trunk, to thereby grasp and brace the trunk within the receptacle once the tree has been positioned in accordance with the desired natural posture. Upon threaded inward advancement of the bolts and attached feet towards the central vertical axis, the brace surfaces of the feet eventually engage the outer surface of the tree trunk, without penetrating through the bark and into the interior of the tree trunk. In this manner, the bolt members can be tightened to better grasp the tree about the outer peripheral surface of the tree trunk.

The apparatus 10 further includes means for bi-directionally transferring liquid between an external container 60 and the reservoir within the receptacle. The bi-directional transferring means includes a flexible hose 62 which extends from the container 60 and terminates at a distal end 64. A plurality of fill ports 66 are provided at spaced intervals about the top rim. The fill ports disposed in fluid communication with the interior reservoir via a channel which extends downwardly through the interior core of the peripheral wall opening into an upper portion of the reservoir through fill opening 67. The fill ports 66 are specifically sized and configured for snug fitted, releasable receipt of the distal end of the flexible hose therein. The plurality of fill ports, at spaced intervals, facilitates selective attachment of the flexible hose to the most conveniently located fill port when the tree is supported within the stand, thereby obviating the need to reach around the tree trunk or to rotate the tree and stand in order to gain access to a fill port.

The container 60 is sized and configured for containing a charge of water sufficient to substantially fill the reservoir. A removable cap 70 on the container 60 facilitates filling of the container with water. A window 72 on the container 60 enables viewing of the amount of water filled within the container. Markings may be provided on the window 72 of the container 60 which correspond with water level markings on the transparent windows 44 of the sight gauges 42 so that a needed amount of water to be filled within the receptacle can be added to the container. To transfer the water from the container to the reservoir, the distal end of the hose is fitted to one of the fill ports and the container is held at a height above the top rim so that the fluid travels by gravity from the container, through the flexible hose and through the selected fill port and into the reservoir.

When it is desired to drain the water contents from within the reservoir, the distal end of the flexible hose is connected to a drain port 80 which, like the fill ports, is sized and configured for snug, releasable receipt of the distal end of the hose therein. A conduit 84 extends from a lower portion of the reservoir, adjacent the bottom of the receptacle, to the drain port, in fluid flow communication therewith. A valve member 88, such as a rotatable gate valve is normally disposed in closed, blocking relation between the conduit and drain port to prevent water within the reservoir from exiting the drain port during normal use of the stand. When draining the reservoir, the distal end is received within the drain port and the valve member is actuated to an open position by manipulating (i.e., rotating) the handle member 89, thereby rotating a valve plate and opening the fluid flow passage from the conduit 84 through to the drain port 80 and attached hose 62. By maintaining the container at a height below the drain port, water within the reservoir flows naturally, by gravity, through the flexible hose and into the container. Once the reservoir has been emptied, the hose is disconnected from the drain port and the water in the container can be emptied into a sink or other desired location.

While the instant invention has been shown and described in what is considered to be a preferred and practical embodiment thereof, it is recognized that departures may be made within the spirit and scope of the present invention which, therefore, should not be limited except as defined in the following claims as interpreted under the doctrine of equivalents.

What is claimed is:

1. A tree stand apparatus comprising:
   a receptacle defining a tree trunk receiving and support means and including a bottom, a peripheral wall surrounding an interior reservoir and extending from the bottom to a top rim surrounding an open top end, with a central longitudinal axis extending from a center of said bottom through a center of said open top;
   a base for supporting said receptacle on a floor surface so that said central longitudinal axis is maintained vertical;
   liquid level display means exteriorly visible on said apparatus for visually indicating a level of liquid in said reservoir;
   brace means for holding the lower end of a tree trunk within said receptacle;
   a container for holding a charge of liquid; and
   means for bi-directionally transferring said liquid between said container and said reservoir and including:
      a flexible hose extending from said container and terminating at a distal end;
      at least one fill port in said top rim and disposed in fluid flow communication with an upper portion of said interior reservoir and being structured and disposed for releasable connection of said distal end of said flexible hose therewith;
      at least one drain Port disposed in fluid flow communication with a lower portion of said interior reservoir and being structured and disposed for releasable connection of said distal end of said flexible hose therewith; and
      valve means for selectively preventing fluid flow from said reservoir through said drain port, said valve means being selectively operable between a normally closed position to prevent said fluid flow and an open position to release said liquid flow from said reservoir through said drain port when said distal end of said flexible hose is connected to said drain port.

2. An apparatus as recited in claim 1 wherein said liquid level display means includes at least one transparent sight gauge defined by a window covering a vertical cavity formed through said peripheral wall of said receptacle, said cavity being disposed in fluid communication with said interior reservoir, and wherein said window is visible from an exterior of said apparatus.

3. An apparatus as recited in claim 2 further including a plurality of said transparent sight gauges provided at spaced intervals about said peripheral wall of said receptacle.

4. An apparatus as recited in claim 3 wherein said plurality of sight gauges each include a floating ball to enhance visibility of a level of liquid in said sight gauge, thereby visually indicating the level of liquid in said reservoir.

5. An apparatus as recited in claim 4 wherein said plurality of sight gauges each include water level markings.

6. An apparatus as recited in claim 1 wherein said brace means includes a plurality of threaded bolt members threadably fitted through said peripheral wall and including a distal end normally disposed within said interior reservoir and each of said plurality of bolt members including a foot member fitted to said distal end, said foot member including an enlarged surface area for engaging an exterior surface of the tree trunk supported within said receptacle.

7. A tree stand apparatus comprising:
   a receptacle defining a tree trunk receiving and support means and including a bottom, a peripheral wall surrounding an interior reservoir and extending from the bottom to a top rim surrounding an open top end, with a central longitudinal axis extending from a center of said bottom through a center of said open top;
   a base for supporting said receptacle on a floor surface so that said central longitudinal axis is maintained vertical;
   liquid level display means exteriorly visible on said apparatus for visually indicating a level of liquid in said reservoir and including at least one transparent sight gauge defined by a window covering a vertical cavity formed through said peripheral wall of said, receptacle, said cavity disposed in fluid communication with said interior reservoir, wherein said window is visible from an exterior of said apparatus;
   brace means for holding the lower end of a tree trunk within said receptacle;
   a container for holding a charge of liquid; and
   means for bi-directionally transferring said liquid between said container and said reservoir and including:
      a flexible hose extending from said container and terminating at a distal end;
      at least one fill port in said top rim and disposed in fluid flow communication with an upper portion of said interior reservoir and being structured and disposed for releasable connection of said distal end of said flexible hose therewith;
      at least one drain port disposed in fluid flow communication with a lower portion of said interior reservoir and being structured and disposed for releasable connection of said distal end of said flexible hose therewith; and valve means for selectively preventing fluid flow from said reservoir through said drain port, said valve means being selectively operable between a normally closed position to prevent said fluid flow and an open position to release said liquid from said reservoir through said drain port when said distal end of said flexible hose is connected to said drain port.

8. An apparatus as recited in claim 7 further including a plurality of transparent sight gauges provided at spaced intervals about said peripheral wall of said receptacle.

9. An apparatus as recited in claim 8 wherein said plurality of sight gauges each include a floating ball to enhance visibility of a level of liquid in said sight gauge, thereby visually indicating the level of liquid in said reservoir.

10. An apparatus as recited in claim 7 wherein said brace means includes a plurality of threaded bolt members threadably fitted through said peripheral wall and including a distal end normally disposed within said interior reservoir and each of said plurality of bolt members including a foot member fitted to said distal end, said foot member including an enlarged surface area for engaging an exterior surface of the tree trunk supported within said receptacle.

11. A tree stand apparatus comprising:
a receptacle defining a tree trunk receiving and support means and including a bottom, a peripheral wall surrounding an interior reservoir and extending from the bottom to a top rim surrounding an open top end, with a central longitudinal axis extending from a center of said bottom through a center of said top;

a base for supporting said receptacle on a floor surface so that said central longitudinal axis is maintained vertical, said base being integrally formed with said receptacle and including an upper annular wall portion extending downwardly and outwardly from said top rim, a lower annular wall portion extending downwardly and outwardly from said upper annular wall portion, and an outermost annular support leg portion integral with said lower annular wall portion and defining an annular trough therebetween;

liquid level display means exteriorly visible on said apparatus for visually indicating a level of liquid in said reservoir;

brace means for holding the lower end of a tree trunk within said receptacle;

a container for holding a charge of liquid; and means for bi-directionally transferring said liquid between said container and said reservoir and including:
a flexible hose extending from said container and terminating at a distal end;
at least one fill port in said top rim and disposed in fluid flow communication with an upper portion of said interior reservoir and being structured and disposed for releasable connection of said distal end of said flexible hose therewith;
at least one drain port disposed in fluid flow communication with a lower portion of said interior reservoir and being structured and disposed for releasable connection of said distal end of said flexible hose therewith; and
valve means for selectively preventing fluid flow from said reservoir through said drain port, said valve means being selectively operable between a normally closed position to prevent said fluid flow and an open position to release said liquid from said reservoir through said drain port when said distal end of said flexible hose is connected to said drain port.

12. An apparatus as recited in claim 11 wherein said liquid level display means includes at least one transparent sight gauge defined by a window covering a vertical cavity formed through said peripheral wall of said receptacle, said cavity being disposed in fluid communication with said interior reservoir, and wherein said window is visible from an exterior of said apparatus.

13. An apparatus as recited in claim 12 further including a plurality of said transparent sight gauges provided at spaced intervals about said peripheral wall of said receptacle.

14. An apparatus as recited in claim 13 wherein said plurality of sight gauges each include a floating ball to enhance visibility of a level of liquid in said sight gauge, thereby visually indicating the level of liquid in said reservoir.

15. An apparatus as recited in claim 14 wherein said plurality of sight gauges each include water level markings.

16. An apparatus as recited in claim 11 wherein said brace means includes a plurality of threaded bolt members threadably fitted through said peripheral wall and including a distal end normally disposed within said interior reservoir and each of said plurality of bolt members including a foot member fitted to said distal end, said foot member including an enlarged surface area for engaging an exterior surface of the tree trunk supported within said receptacle.

* * * * *